US006655708B2

(12) United States Patent
Handago

(10) Patent No.: US 6,655,708 B2
(45) Date of Patent: Dec. 2, 2003

(54) WHEELCHAIR WITH SAFETY BUMPERS

(76) Inventor: Christopher M. G. Handago, 560 N. Gay St., Apt. 224, Auburn, AL (US) 36830

( * ) Notice: Subject to any disclaimer, the term of this patent is extended or adjusted under 35 U.S.C. 154(b) by 0 days.

(21) Appl. No.: 10/011,559

(22) Filed: Nov. 6, 2001

(65) Prior Publication Data

US 2003/0085547 A1 May 8, 2003

(51) Int. Cl.[7] .................... B62J 27/00

(52) U.S. Cl. .................... 280/304.3; 280/304.1; 293/119; 293/126

(58) Field of Search .................... 280/304.1, 304.3, 280/87.01, 87.021, 87.051; 293/126, 119

(56) References Cited

U.S. PATENT DOCUMENTS

| | | | | | |
|---|---|---|---|---|---|
| 715,562 | A | * | 12/1902 | Way | 474/156 |
| 3,052,486 | A | * | 9/1962 | Malmquist | 280/211 |
| 3,726,556 | A | * | 4/1973 | West | 293/127 |
| 3,999,778 | A | * | 12/1976 | Markiel | 280/304.1 |
| 4,322,093 | A | * | 3/1982 | Otto | 280/650 |
| 4,699,392 | A | * | 10/1987 | Ku | 280/87.051 |
| 5,997,017 | A | * | 12/1999 | Tilley | 280/87.021 |
| 6,276,703 | B1 | * | 8/2001 | Caldwell | 280/242.1 |
| 6,361,058 | B1 | * | 3/2002 | Yuan | 280/242.1 |
| 2001/0014569 | A1 | * | 8/2001 | Baker | 446/448 |
| 2001/0038189 | A1 | * | 11/2001 | Caldwell | 280/244 |

FOREIGN PATENT DOCUMENTS

JP 08244619 A * 9/1996 .................... B62B/3/00

* cited by examiner

*Primary Examiner*—Kevin Hurley
*Assistant Examiner*—Daniel Yeagley

(57) ABSTRACT

A wheelchair is provided with at least one safety bumper which is mounted to the frame of the wheelchair outwardly of one of the wheels. The outer surface of the bumper functions as a cam surface for contacting a door and maintaining the door open while the wheelchair passes through a doorway. The bumper could be adjustable in length and could be detachably mounted to the wheelchair.

22 Claims, 3 Drawing Sheets

WHEELCHAIR WITH SAFETY BUMPERS

BACKGROUND OF THE INVENTION

Users of wheelchairs have encountered difficulties in connection with the passing through doorways, particularly with self-closing doors which frequently do not tend to give enough time to allow wheelchair users ingress and egress. In order for a wheelchair user to negotiate self-closing doors, a series of steps are required. First, the user approaches the door. Second, the user opens the door. Third, the user enters the doorway. Fourth, the user proceeds through the doorway. Fifth, the user enters the room. Lastly, the door closes behind the user. Self-closing doors were designed to assist in climate control and to prevent the need for the users to close the door behind them. In proceeding through these six steps, particular difficulties are generally encountered by a user having to open the door and then having to wheel the chair through the open doorway. This tends to take longer during ingress and egress than would for a walking individual. Particular concern is that the wheelchair could be moved through the doorway quickly enough before the chair comes into contact with the door. Some users have found it necessary to hold the door with one arm and wheel with the other. When a wheelchair user does come into contact with the door, the door would hit the wheel of the chair or the hands of the user or the footrest or the knee of the user.

SUMMARY OF THE INVENTION

An object of this invention is to provide a wheelchair with at least one safety bumper to protect the user, particularly while moving through a doorway.

In accordance with this invention a safety bumper is mounted to the wheelchair outwardly of at least one of the wheels. The bumper extends partially forwardly of the wheel and has an outer surface which functions as a cam. In use, for example, the outer surface of the bumper would contact the door and maintain the door open as the user passes through the doorway. The provision of the safety bumper outwardly of the wheel also creates a barrier to protect the user's hand against a self-opening door closing on the user and/or prevents the door from contacting the wheel or footrest.

DETAILED DESCRIPTION OF THE PREFERRED EMBODIMENTS OF THE INVENTION

Figure 1:
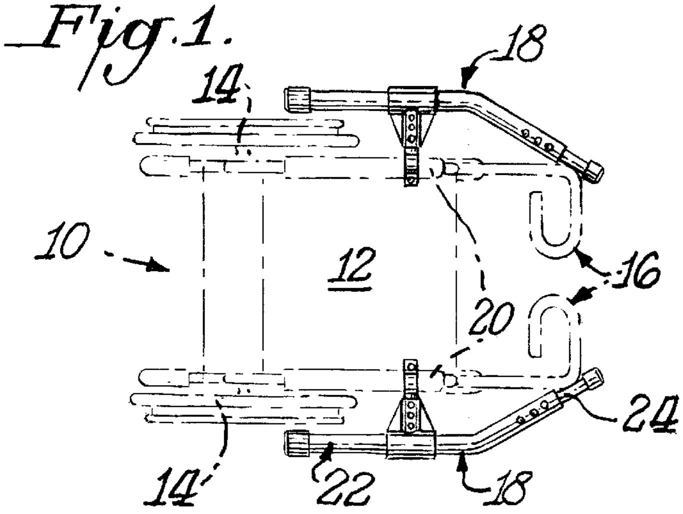
FIG. 1 is a top plan view of a wheelchair incorporating a set of safety bumpers in accordance with this invention.
Figure 2:
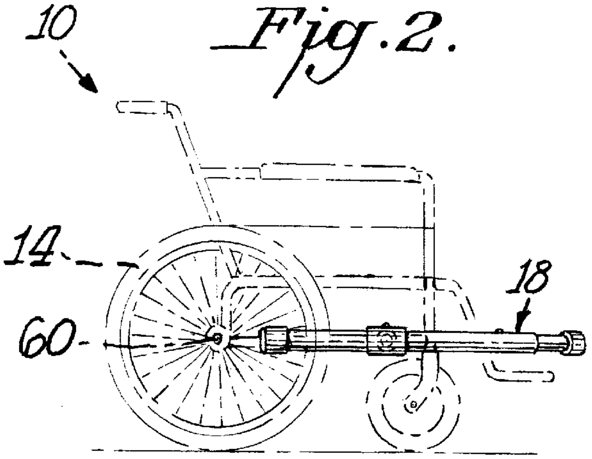
FIG. 2 is a side elevational view of the wheelchair shown in FIG. 1.
Figure 3:
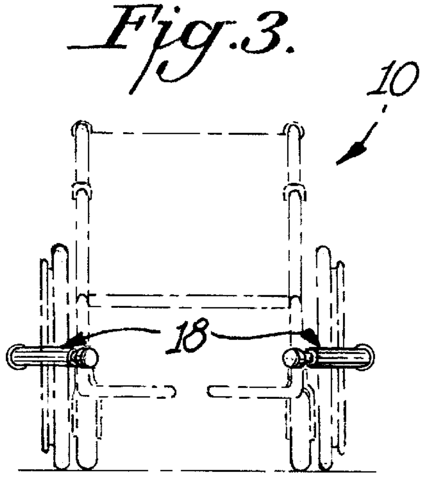
FIG. 3 is a front elevational view of the wheelchair shown in FIGS. 1–2.

FIGS. 1–3 show, in phantom, a conventional wheelchair 10. The chair 10 includes a seat 12 and a pair of wheels

14,14. FIGS. 1–3 also show footrests 16,16. In use, a user would sit on the seat 12 and would move the wheelchair 10 by placing the user's hands on one or both wheels 14,14 and rotating the wheels in either a forward or rearward direction. In accordance with this invention a safety bumper 18 is mounted on each side of the wheelchair 10 by securement to the chair frame 20.

Figure 4:
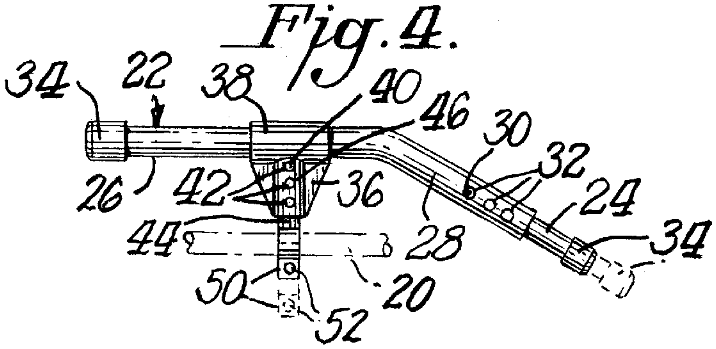
FIG. 4 is an enlarged top plan view of the safety bumper shown on the wheelchair on FIGS. 1–3.

In general, safety bumper 18 could be considered as including an outer bumper assembly having a first bumper member 22 and a second bumper member 24. Preferably, first bumper member 22 is made of hollow tubular form so that the second bumper member 24 could be telescoped into first bumper member 22. As best seen in FIGS. 1 and 4 the first bumper member 22 includes a first portion 26 which is disposed generally parallel to the wheelchair frame 20. A second portion 28 is bent inwardly in a direction toward the footrests 16. The outer surface of the bumper assembly may be considered as a cam surface as later described. By providing a second bumper member 24 telescoped into second portion 28 of first bumper member 22 it is possible to vary the overall length of the outer bumper assembly. Any suitable manner of length adjustment could be used. For example, second bumper member 24 could be provided with a spring biased pin 30 which would selectively snap into one of a plurality of holes 32 in second portion 28 of first member 22. A protective cap 34,34 is mounted on each end of the outer bumper assembly to minimize any damage that might otherwise be caused such as scratching or chipping when the outer bumper assembly is contacted by, for example, a door.

Figure 5:
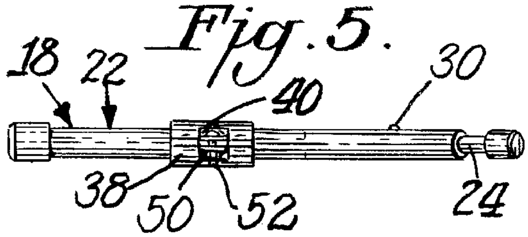
FIG. 5 is a side elevational view of the safety bumper shown in FIG. 4.

As also shown particularly in FIG. 4 a connecting member 36 is provided for securing the outer bumper assembly to the wheelchair. In the form of the invention shown in FIGS. 4–5 connecting member 36 is generally in the form of a T-shaped connector having a hollow passageway or sleeve 38 through which first bumper member 22 extends. The extension 40 of connecting member 36 may also be tubular and may be provided with a series of holes 42 for receiving a tubular mounting member 44 which is secured to the lower frame rail 20. Mounting member 44 would also have a spring button or detent 46 that would snap into one of the holes 42. This provides lateral adjustability for the location of the outer bumper assembly. Mounting member 44 could be secured to lower frame rail 20 in any suitable manner such as by a clamp 50.

Figure 6:
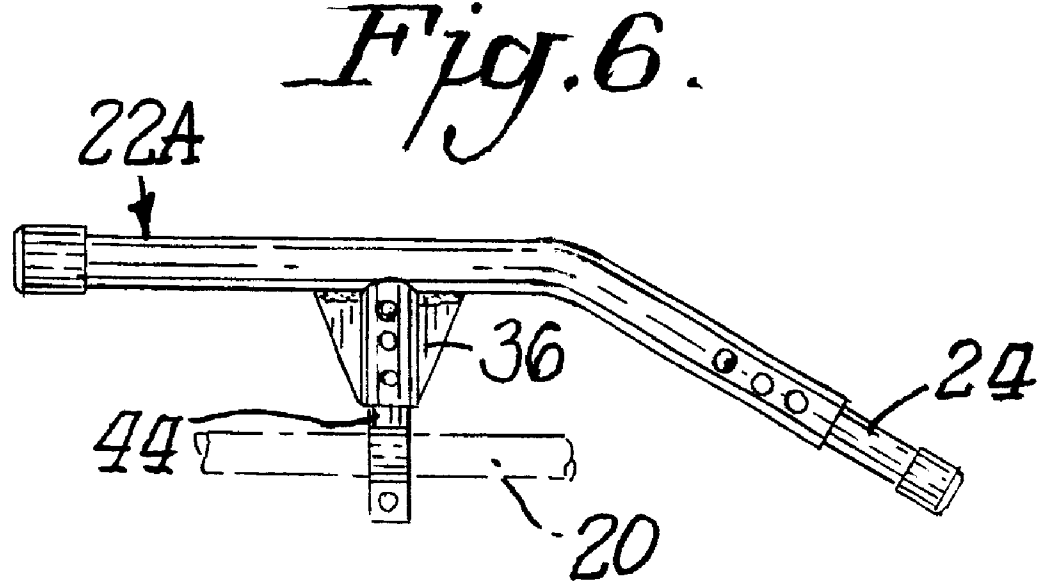
FIGS. 6–7 are views similar to FIGS. 4–5, respectively, of a modified form of this invention.
Figure 7:
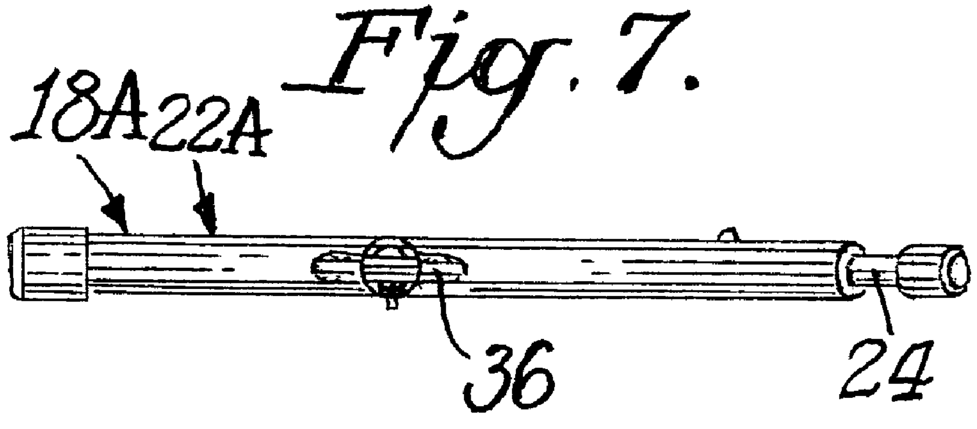

FIGS. 6–7 show a preferred alternative manner of securing the connecting member 36 to the first bumper member. As shown therein the connecting member is welded directly to first bumper member 22A of safety bumper 18A. As a result, there are no projections outwardly of the first bumper member, thus eliminating the possibility of any such protuberances or extensions scratching a door or other surface. This differs from the embodiment of FIGS. 4–5 where the sleeve 38 extends outwardly of the first bumper member which might cause some damage to doors or other objects that the bumper may contact. While welding is the preferred manner of securement of connecting member 36 to bumper member 22 other types of securement may be used. In the preferred practice of the invention, however, whatever type of securement is used should be such that the outer surface of first bumper member 22 is flat or free of obstructions other than, for example, the protective cap 34.

The invention could also be practiced where any surface of the safety bumper, which is likely to contact a door or other object, is coated with a protective material such as foam or TEFLON®.

Preferably, a safety bumper 18 is provided on each side of the wheelchair. The invention, however may be broadly practiced where only a single safety bumper is used on only one side of the wheelchair. The invention may also be practiced where the safety bumper is mounted at a location other than the lower frame rail, depending upon the wheelchair structure. What is important is that the safety bumper has an outer surface located outwardly of its respective wheel so that if there is contact by a door or other object the contact will be against a safety bumper rather than against the user or the wheel. Preferably the outer cam surface is bent or non-planar such as being angled from 35° to 45° with respect to the longitudinal axis of the wheelchair or with respect to the first bumper member portion 26 where the bumper portion 26 is straight and parallel to the lower frame rail 20. It is to be understood, however, that the invention could be practiced where the outer surface is a curve which is of constant diameter or of changing diameter or where the bend is of an angle other than 30°–45°.

The clamp 50 shown in FIG. 4 could be secured in any suitable manner such as by one or more fasteners 52 where the clamp is made in the form of two arcuate plates so that the fastener or screw or bolt would press the plates against each other to tightly mount the plates on lower frame rail 20.

Once attached the safety bumper 18 has no moving parts and the user does not need to touch the bumper again. The bumper 18 is preferably made out of steel conduit and is welded together for durability. Although the device might be made from steel, because of its tubular form it is not particularly heavy and thus does not pose a weight durable burden. Other light weight materials, such as aluminum or plastics, may be used. The plastic or rubber end caps 34,34 prevent damage to doors or other objects.

The safety bumper 18 may be painted black or of any other color so that it does not particularly stand out and thus could be painted to match or complement the color of the wheelchair. Preferably, the shape of bumper 18 gives the impression that it is a part of the wheelchair and not an attachment. It has been found that the safety bumper could project laterally outwardly of the wheel 14 by approximately 1 inch. Thus, the safety bumper does not greatly impact the wheelbase of the chair thereby allowing ingress and egress through doorways.

By incorporating a safety bumper on one or preferably both sides of the wheelchair, the user need not worry about quickly entering the doorway because the bumper protects the wheelchair user from the impact of the closing door. The door can thereby come into contact with the bumper, but because the bumper extends laterally beyond or outwardly of the wheel the user does not have to worry about the door impacting the hands, legs, arms or wheel. The user only needs to place the bumper against the door and wheel forwardly. The action of the bumper pushing against the door will turn the wheelchair into the doorway. Thus, the door which previously caused a problem can itself be used as an aid for entry.

Figure 8:
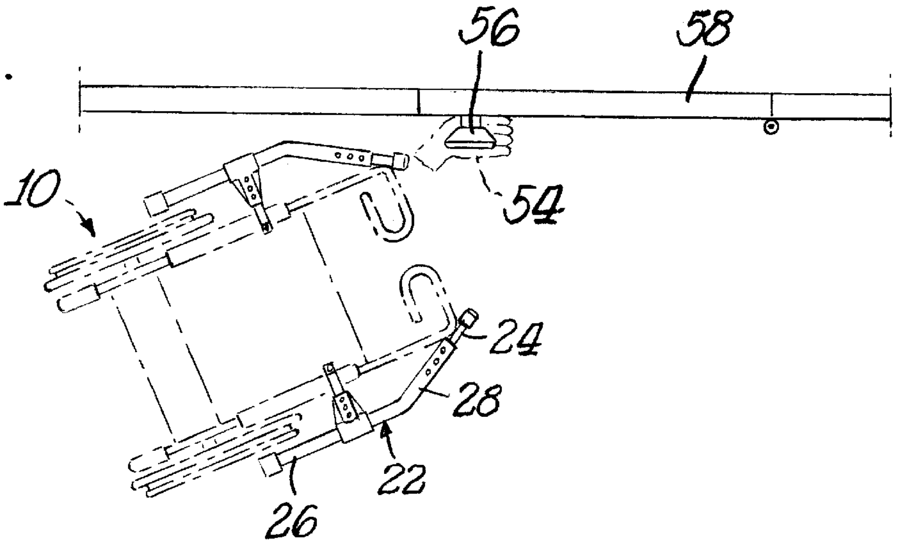
FIGS. 8–10 are top plan views showing use of the wheelchair and safety bumpers in the practice of this invention.
Figure 9:
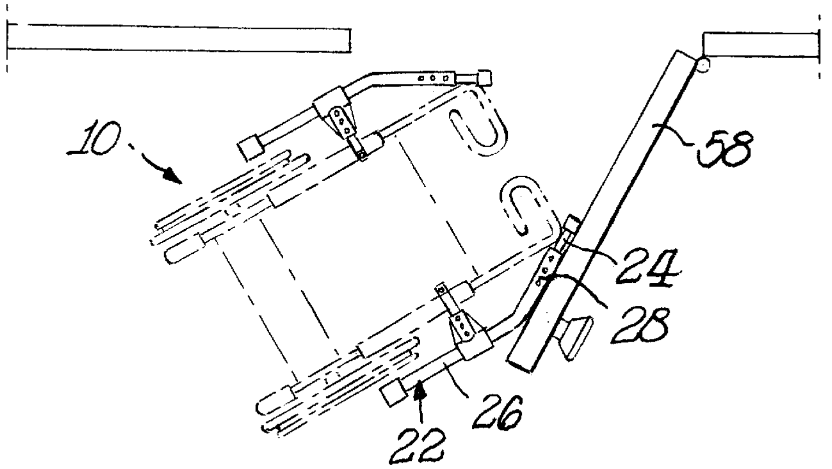
Figure 10:
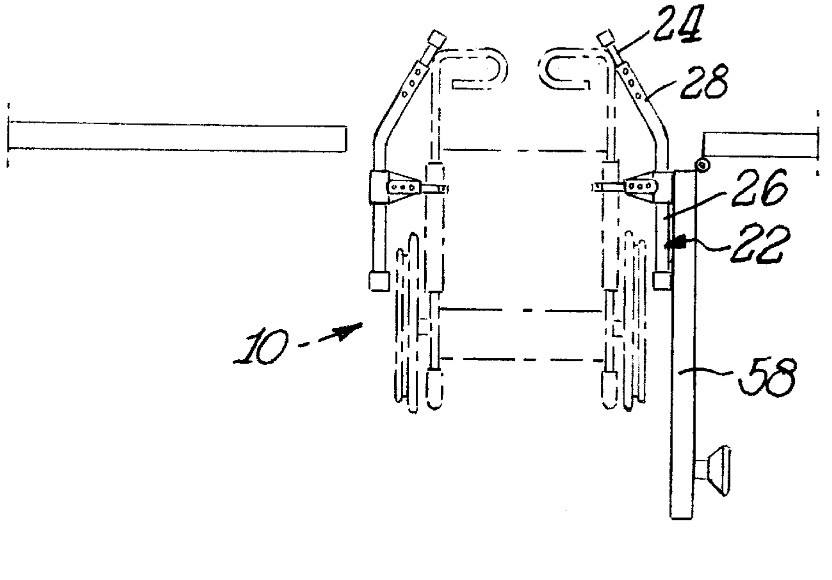

FIGS. 8–10 show various steps in the sequence of using a wheelchair 10 with the safety bumpers 18 for entering a room through a doorway. As shown in FIG. 8 the user's hand 54 would grasp the doorknob 56 of a door 58. The user would then move the door to an open position as shown in FIG. 9. The door 58 would initially be contacted by the outer surface of the bent portion of the outer bumper assembly, namely, the second bumper member 24 and bent portion 28, as shown in FIG. 9. Once the door is in contact with the safety bumper it is not necessary for the user's hand to contact any part of the door and the user could then wheel through the doorway as shown in FIG. 9. As the user moves through the doorway the wheelchair would be turned to enter the completely open doorway as shown in FIG. 10. In that position the door 58 is in contact with the first bumper member 22 and its straight portion 26 which holds the door open until the wheelchair had sufficiently passed into the next room.

As illustrated in FIGS. 1–2 and 8–10 the bumper 18 preferably extends at least as far and preferably slightly in front of the footrests 16. The opposite end of the bumper is illustrated in FIGS. 1 and 8–10 as terminating outwardly of the wheel 14 forwardly of the center axis 60. See FIG. 2. If desired, however, the bumper 18 could be of longer length to be disposed to at least the end of or slightly completely beyond the entire wheel 14.

Various changes could be made to the basic bumper structure described above. For example, a quick release attachment could be added to make collapsing of the wheelchair for storing purposes easier. Thus, bumpers 18, 18 could be quickly removed and the wheelchair 10 then could be collapsed. Because custom wheelchairs do not always have horizontal framerails a locking clamp 50 capable of rotating 360° could be utilized as part of the mounting member for attaching the bumper to the rail. Otherwise, any suitable type of fastening could be used.

The invention could be practiced by incorporating a quick release attachment for bumper 18 such as by clamp 50. This would permit the bumper to be readily removed and facilitate collapsing of the wheelchair for storing purposes. This would also be in line with practices of some users who remove the wheels at various times since the bumper could be readily removed which would thereby permit easy removal of the wheels. By utilizing telescopic parts such as the second bumper member 24 telescoping into and out of first bumper member 22 and by having first bumper member 22 telescoped into the sleeve portion 38 of connecting member 36 it is possible to adjust the location and size of the bumper 18 in accordance with desires when a user is eating or sitting at a desk or table. The length and transverse adjustability also permits a generally standard type bumper to be custom attached to a particular wheelchair.

The bumper 18 addresses four human factor issues: (1) safety, (2) comfort, (3) efficiency and (4) ease of use. (1) There is added safety because the wheelchair user no longer has to worry about the door closing on the hands, knees, wheel or footrest. The user can simply open the door and if the door closes on the wheelchair the bumper 18 prevents contact with the body or the moving parts of the wheelchair. (2) There is comfort because the bumper prevents the need for hurrying through a doorway. The user can proceed at the user's own pace. (3) There is efficiency because the user no longer has to hold the door while attempting to wheel through the doorway. The user can use both hands for wheeling purposes which speeds up the ingress/egress process. (4) There is ease of use because the bumper 18 attaches to the chair 10 and once attached the user need not touch it again.

The bumper can be permanently affixed or can be detachably mounted to be easily removed when needed. The bumper becomes an extension of the wheelchair for assist purposes. Other advantages include the bumper preventing damage to moving parts that arise from impact thereby reducing replacement costs. Once the bumper is replaced it not only prevents the wheels 14, 14 from side impact, but also from frontal impact. Because of the lightweight nature and compactness of the bumper the addition of the bumper does not create a burden by the added weight and by extending, for example, only an inch on each side of the wheelchair. No problem is created of making the wheelchair too wide to impede passing through a doorway. In fact, it should be possible for two such wheelchairs to pass each other in hallways without hitting each other.

What is claimed is:

1. In a wheelchair having a seat and a rotatable wheel on each side of said seat, the improvement being in that a safety bumper is mounted to said wheelchair outwardly of at least one of said wheels, said bumper extending partially forwardly of said wheel, said bumper being adjustable in said safety bumper overall length, and said bumper having an outer cam surface for contacting a door and maintaining the door open while said wheelchair passes through a doorway and while the user's hand may be placed on said one wheel and be protected against undesired contact by the door.

2. The wheelchair of claim 1 including a second safety bumper, and each of said safety bumpers being mounted on a respective side of said wheelchair adjacent a respective one of said wheels.

3. The wheelchair of claim 1 wherein a portion of said bumper is angled inwardly toward a footrest on said wheelchair.

4. The wheelchair of claim 1 wherein said bumper is detachably mounted to a frame rail of said wheelchair.

5. The wheelchair of claim 2 wherein said second safety bumper is adjustable in said second safety bumper overall length.

6. The wheelchair of claim 1 wherein said bumper is laterally adjustable toward and away from said wheel.

7. The wheelchair of claim 2, wherein said bumper includes a first bumper member mounted to said wheelchair and a second bumper member telescoped into said first bumper member.

8. The wheelchair of claim 7 wherein a mounting member is secured to a frame rail of said wheelchair, a connecting member being secured to said mounting member, and, said first bumper being mounted to said connecting member.

9. The wheelchair of claim 8 wherein said first bumper member includes a straight portion parallel to said wheel and an inwardly bent portion, and said second bumper member being telescoped into said bent portion.

10. The wheelchair of claim 1 wherein said wheelchair includes a footrest, and wherein said bumper extends forwardly of said footrest.

11. The wheelchair of claim 10 wherein said bumper is detachably mounted to a frame rail of said wheelchair.

12. The wheelchair of claim 10 wherein a portion of said bumper is angled inwardly toward said footrest on said wheelchair.

13. The wheelchair of claim 10 wherein said bumper is laterally adjustable toward and away from said wheel.

14. The wheelchair of claim 10 wherein said bumper comprises a first bumper member having a first portion generally parallel to said wheel and a second portion bent inwardly toward said wheelchair.

15. The wheelchair of claim 10 wherein said bumper is permanently attached to said wheelchair.

16. The wheelchair of claim 2 wherein said safety bumpers are spaced from each other with an open space therebetween.

17. A safety bumper for attachment to a wheelchair comprising an outer bumper assembly, said outer bumper assembly being adjustable in length, said bumper assembly comprising, a first bumper member having a first portion and a second portion, a connecting member, said first portion being mounted to said connecting member, a mounting member, said connecting member being secured to said mounting member, said mounting member having fastening structure for securing said mounting member to a wheelchair whereby said bumper assembly is adapted to be mounted outwardly of a wheel on the wheel-chair, said second portion being forward of said connecting member and being inclined away from said first portion in a direction toward a footrest of a wheelchair to which said bumper is adapted to be attached, and said outer bumper assembly having an outer surface remote from said connecting member which is non-planar to form a cam surface for contacting an object to protect a user's hand on the wheel.

18. The bumper of claim 17 including a second bumper member telescoped into said first bumper member to provide for said adjustability in length.

19. The bumper of claim 18 wherein said first bumper member is laterally adjustable toward and away from said mounting member.

20. The bumper of claim 19 wherein said connecting member is a T-connector mounted to one side of said first bumper member, and said first bumper member being free of any outward projections on a second side opposite to said one side where said connecting member is mounted.

21. The bumper of claim 17 wherein said first bumper member is laterally adjustable toward and away from said mounting member.

22. The bumper of claim 17 wherein said connecting member is a T-connector mounted to one side of said first bumper member, and said first bumper member being free of any outward projections on a second side opposite to said one side where said connecting member is mounted.

* * * * *